(12) United States Patent
Doi et al.

(10) Patent No.: US 8,906,988 B2
(45) Date of Patent: Dec. 9, 2014

(54) INTEGRATED MOLDED PRODUCT

(75) Inventors: Kumiko Doi, Fuji (JP); Kouichi Sakata, Fuji (JP)

(73) Assignee: Wintech Polymer Ltd., Tokyo (JP)

( * ) Notice: Subject to any disclaimer, the term of this patent is extended or adjusted under 35 U.S.C. 154(b) by 0 days.

(21) Appl. No.: 13/880,996

(22) PCT Filed: Oct. 28, 2011

(86) PCT No.: PCT/JP2011/074937
§ 371 (c)(1),
(2), (4) Date: Aug. 5, 2013

(87) PCT Pub. No.: WO2012/057318
PCT Pub. Date: May 3, 2012

(65) Prior Publication Data
US 2013/0324649 A1    Dec. 5, 2013

(30) Foreign Application Priority Data

Oct. 28, 2010  (JP) ................... 2010-242501

(51) Int. Cl.
| | |
|---|---|
| *C08K 5/49* | (2006.01) |
| *C08K 5/51* | (2006.01) |
| *C08K 5/524* | (2006.01) |
| *C08K 5/5393* | (2006.01) |
| *B32B 27/36* | (2006.01) |
| *C08L 67/02* | (2006.01) |
| *C08J 5/12* | (2006.01) |
| *C08K 5/527* | (2006.01) |

(52) U.S. Cl.
CPC ............... *C08K 5/527* (2013.01); *C08L 67/02* (2013.01); *C08K 5/5393* (2013.01); *C08J 5/124* (2013.01); *C08J 2367/02* (2013.01); *C08J 2483/04* (2013.01)

USPC ........... 524/115; 524/120; 524/126; 524/128; 524/135; 524/136; 428/446; 428/480

(58) Field of Classification Search
None
See application file for complete search history.

(56) References Cited

U.S. PATENT DOCUMENTS

| | | | |
|---|---|---|---|
| 4,102,853 A * | 7/1978 | Kawamura et al. | 524/425 |
| 6,762,235 B2 * | 7/2004 | Takenaka et al. | 524/494 |

(Continued)

FOREIGN PATENT DOCUMENTS

| | | |
|---|---|---|
| JP | H09-165503A A | 6/1997 |
| JP | H09-241493 A | 9/1997 |

(Continued)

OTHER PUBLICATIONS

Machine Translation of JP 2007-077205 A. Mar. 29, 2007.*

(Continued)

*Primary Examiner* — Robert C Boyle
*Assistant Examiner* — Stephen Rieth
(74) *Attorney, Agent, or Firm* — Hoffmann & Baron, LLP

(57) ABSTRACT

Provided is an integrated molded product in which a molded resin product containing a phosphorus compound is used and an addition-reactive silicone adhesive agent is used to achieve strong bonding. The integrated molded product comprises a thermoplastic resin molded product made of a thermoplastic resin composition comprising a polybutylene terephthalate resin and a phosphorus compound, the content of the phosphorus compound being 0.5% by mass or less; an addition-reactive silicone composition; and a member; and the thermoplastic resin molded product and the addition-reactive silicone composition are brought into contact with each other. The phosphorus compound to be used is preferably a trivalent phosphorous compound.

2 Claims, 3 Drawing Sheets

(56) References Cited

U.S. PATENT DOCUMENTS

| | | | |
|---|---|---|---|
| 8,404,763 | B2 | 3/2013 | Sakata et al. |
| 8,734,956 | B2 | 5/2014 | Sakata et al. |
| 2010/0266857 | A1 | 10/2010 | Sakata et al. |
| 2011/0092616 | A1 | 4/2011 | Sakata et al. |

FOREIGN PATENT DOCUMENTS

| | | | |
|---|---|---|---|
| JP | H10-338846 A | | 12/1998 |
| JP | 2004-343684 A | | 12/2004 |
| JP | 2005-008736 A | | 1/2005 |
| JP | 2007077205 A | * | 3/2007 |
| JP | 2009-149736 A | | 7/2009 |
| WO | 2009/081572 A1 | | 7/2009 |
| WO | 2009/150833 A1 | | 12/2009 |

OTHER PUBLICATIONS

Machine Translation of JP 09-165503 A. Jun. 24, 1997.*
Partial Written Translation of JP 09-165503 A. Jun. 24, 1997.*
Notice of Office Action issued to CN Application No. 201180051922.X, mailed Sep. 4, 2014.

* cited by examiner ic resin is used for various products and parts since it has features such as easy molding and light-weight. Among thermoplastic resins, a polybutylene terephthalate resin has particularly excellent mechanical strength, electrical properties, and physical and chemical properties, and is also excellent in processability. Therefore, the polybutylene terephthalate resin is used in a wide range of automobiles and electrical/electronic part applications, as an engineering plastic.

INTEGRATED MOLDED PRODUCT

TECHNICAL FIELD

The present invention relates to an integrated molded product.

BACKGROUND ART

A resin molded product obtained by molding a thermoplastic resin is used for various products and parts since it has features such as easy molding and light-weight. Among thermoplastic resins, a polybutylene terephthalate resin has particularly excellent mechanical strength, electrical properties, and physical and chemical properties, and is also excellent in processability. Therefore, the polybutylene terephthalate resin is used in a wide range of automobiles and electrical/electronic part applications, as an engineering plastic.

The resin molded product is sometimes bonded with other members depending on applications. There have been known, as a method in which a resin molded product is bonded with other members, methods such as bonding with an adhesive, double-shot molding, hot plate welding, vibration welding, and laser welding. The bonding method is selected taking account of applications and shape of a resin molded product, and a preferable bonding method varies depending on applications. Since it is difficult to use welding processing in the case of bonding with different type resins and metals, techniques such as adhesion, screw fastening, and staking are commonly employed.

An example of bonding a resin molded product with other members includes a case material which houses a substrate including electronic parts mounted thereon (Patent Document 1). The reason why the substrate is housed in the case material is to relieve damage of electronic parts, caused by dusts and external impact, etc.

Electronic parts housed in the above case material are sometimes subjected to potting. The reason is to prevent electronic parts from rusting by moisture, etc. Examples of electronic parts subjected to the potting include various automobile electronic control systems, sensors, hybrid ICs for automobiles and electric appliances, and semiconductor parts (Patent Document 2).

An adhesive is used to bond the case housing the above substrate and electronic parts with a lid, or to fix them in a case, and an epoxy-based adhesive and a silicone-based adhesive are known as potting agents used to apply potting. In the case of obtaining an integrated molded product to which heat resistance and cold resistance are required, an addition-reactive silicone-based adhesive (adhesive of a type in which curing is performed using a platinum catalyst) is preferably used.

In the case of bonding a resin molded product with other members using an addition-reactive silicone-based adhesive, or the case of subjecting to the potting, when a phosphorus compound is contained in a resin molded product, this phosphorus compound inhibits an addition reaction due to a platinum catalyst. As a result, adhesion at a contacting portion between an adhesive and a resin molded product and other members is likely to become insufficient.

Usually, the phosphorus compound is added for the purpose of imparting desired physical properties to a resin molded product. For example, the phosphorus compound can be added to a resin as a flame retardant or a stabilizer, and exerts the effect of imparting flame retardance to a resin composition and preventing deterioration of physical properties or the like under high-temperature conditions. As mentioned above, the phosphorus compound is known as a useful additive, and the phosphorus compound is often contained in a resin composition as an essential component.

Among phosphorus compounds, a trivalent phosphorus compound is added to a thermoplastic resin as an antioxidant, etc, and can prevent oxidative deterioration of a resin molded product, and the composition obtained by adding the trivalent phosphorus compound exhibits higher heat stability.

As mentioned above, the phosphorus compound is known as a useful additive. However, in a resin molded product containing the phosphorus compound, the phosphorus compound is likely to inhibit curing in bonding using the addition-reactive silicone-based composition, or potting using the addition-reactive silicone-based composition.

Patent Document 1: Japanese Unexamined Patent Application, Publication No. 2004-343684

Patent Document 1: Japanese Unexamined Patent Application, Publication No. 2009-149736

DISCLOSURE OF THE INVENTION

Problems to be Solved by the Invention

The present invention has been made so as to solve the above problems, and an object thereof is to provide a technique in which, curing inhibition does not occur even though an addition-reactive silicone-based composition is in contact with a resin molded product containing a phosphorus compound to be used.

Means for Solving the Problems

The present inventors have intensively studied so as to solve the above problems. As a result, they have found that it is possible to suppress a problem of curing inhibition of an addition-reactive silicone-based adhesive due to a phosphorus compound when the amount of a phosphorus compound used in a resin molded product is 0.5% by mass or less, and thus completing the present invention. More specifically, the present invention provides the followings.

(1) An integrated molded product comprising a thermoplastic resin molded product made of a thermoplastic resin composition comprising a polybutylene terephthalate resin and a phosphorus compound, the content of the phosphorus compound being 0.5 mass % or less of the whole composition; an addition-reactive silicone composition; and a member; wherein the thermoplastic resin molded product and the addition-reactive silicone composition are brought into contact with each other.

(2) The integrated molded product according to (1), wherein the phosphorus compound is a trivalent phosphorus compound.

(3) The integrated molded product according to (2), wherein the trivalent phosphorus compound is a phosphonite-based compound and/or a phosphite-based compound.

(4) The integrated molded product according to any one of (1) to (3), wherein the content of the polybutylene terephthalate resin in the thermoplastic resin composition is 40% by mass or more.

Effects of the Invention

In the present invention, since the amount of a phosphorus compound contained in a resin molded product is 0.5% by mass or less, it is possible to suppress curing inhibition of an addition-reactive silicone adhesive due to the phosphorus compound.

BRIEF DESCRIPTION OF THE DRAWINGS

FIG. 3 is a schematic view showing an integrated molded product of Example, in which

EXPLANATION OF REFERENCE NUMERALS

1: Integrated molded product
10: Case
101: First bonding surface
11: Cover
111: Second bonding surface
12: Addition-reactive silicone-based composition

PREFERRED MODE FOR CARRYING OUT THE INVENTION

Embodiments of the present invention will be described in detail below, but the present invention is not limited to the following embodiments.

An integrated molded product of the present invention includes a thermoplastic resin molded product, an addition-reactive silicone-based composition, and a member. The thermoplastic resin molded product may be a single molded product, or may be composed of a plurality of molded products. When the thermoplastic resin molded product is composed of two molded products, for example, a first thermoplastic resin molded product and a second thermoplastic resin molded product, it is possible to exemplify an integrated molded product obtained by bonding by an addition-reactive silicone-based composition (sometimes simply referred to as a silicone-based composition in the following descriptions). In the first embodiment, at least one of a first thermoplastic resin molded product and a second thermoplastic resin molded product is made of a polybutylene terephthalate resin containing 0.5% by mass or less of a phosphorus compound, and the other thermoplastic resin molded product is not particularly limited.

In the case of the single molded product, a member may be adhered to a molded product thereof by a silicone-based composition; or a member may be bonded to a thermoplastic resin molded product by screw fastening, and the periphery may be coated with a silicone-based composition; or a member may be housed in a container-shaped molded product, and may be potted with a silicone-based composition.

First, a schematic example of the integrated molded product of a first embodiment of the present invention will be described with reference to the accompanying drawings.

Figure 1A:
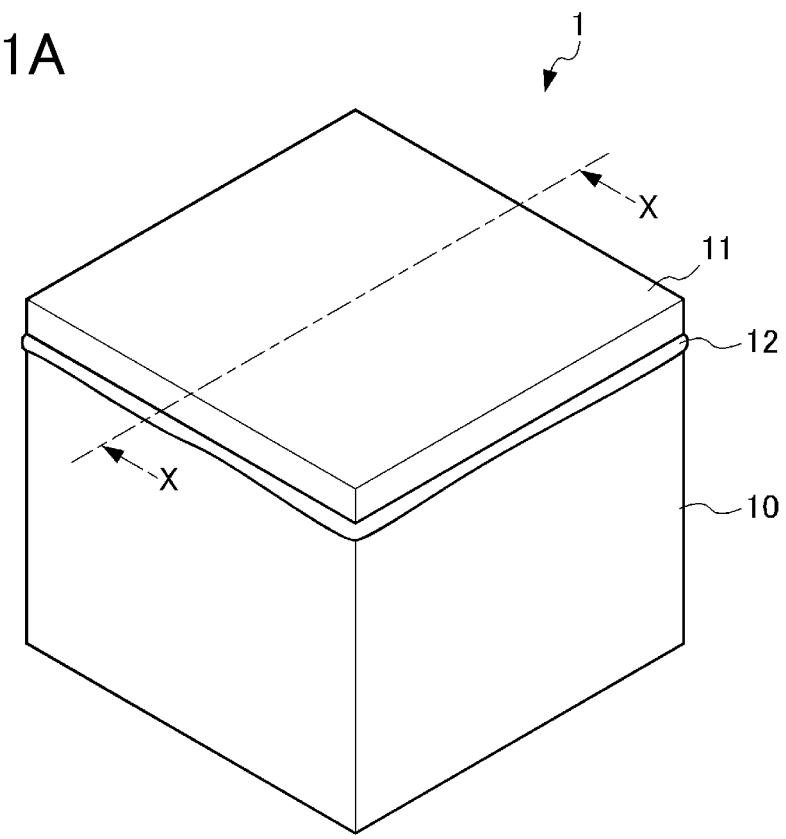
FIG. 1(a) is a perspective view schematically showing an integrated molded product 1 of a first embodiment.
Figure 1B:
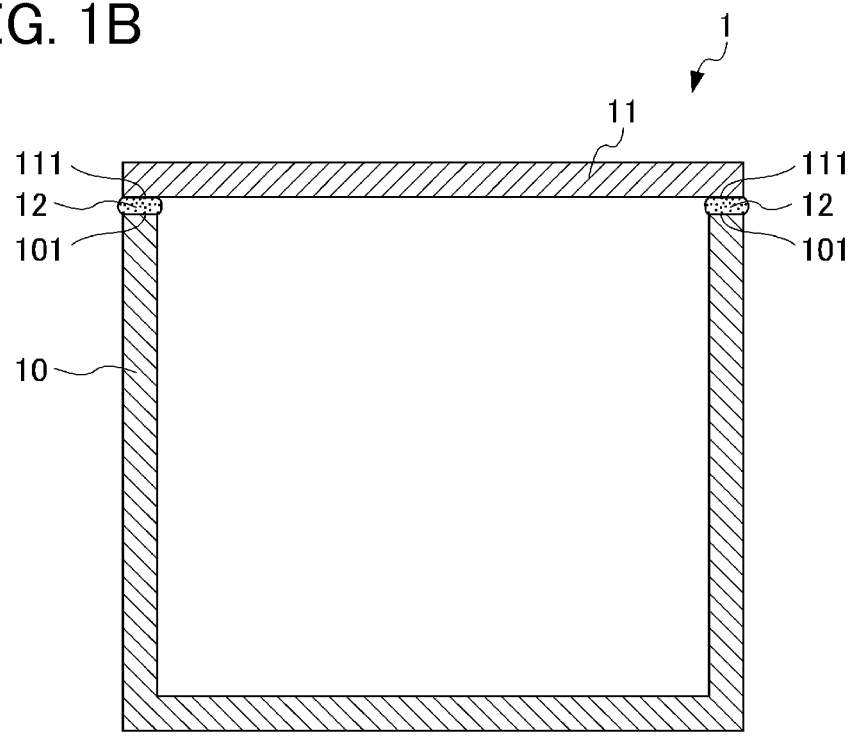
FIG. 1(b) is a cross-sectional view schematically showing a cross section taken along the line X-X of FIG. 1(a).

FIG. 1 is a view showing a first embodiment of an integrated molded product of the present invention, FIG. 1(a) is a perspective view schematically showing the integrated molded product 1 of the first embodiment, and FIG. 1(b) is a cross-sectional view schematically showing a cross section taken along the line X-X of FIG. 1(a).

As shown in FIG. 1, an integrated molded product 1 includes a case 10, a cover 11 and an addition-reactive silicone-based composition 12, and the case 10 is bonded to the cover 11 by the addition-reactive silicone-based adhesive 12 to form a box-like structure as a whole.

The case 10 is a box-shaped part having an opening on one surface, and corresponds to the thermoplastic resin molded product in the present invention. The case 10 has, on an end surface of a surface including an opening existing thereon, a first bonding surface 101 for bonding to the cover 11 through the addition-reactive silicone-based composition 12.

The cover 11 is a plate-shaped molded product, and corresponds to the member in the present invention. The cover 11 has, on an outer periphery of one surface, a second bonding surface 111 for bonding to the case 10 through the addition-reactive silicone-based composition 12.

It is required for the case 10 and the cover 11 to have heat resistance enough to endure a curing temperature of the addition-reactive silicone-based composition 12. Therefore, the case 10 and the cover 11 preferably use, as a raw material, a polybutylene terephthalate resin (details will be mentioned below) which is a thermoplastic resin having high heat resistance.

The addition-reactive silicone-based composition 12 is as an adhesive for bonding a first bonding surface 101 to a second bonding surface 111. The addition-reactive silicone-based composition 12 is applied to at least one surface of a first bonding surface 101 and a second bonding surface 111, and then the first bonding surface 101 is bonded to the second bonding surface 111 by bringing the first bonding surface 101 into contact with the second bonding surface 111.

The embodiment mentioned above is a first embodiment of an integrated molded product of the present invention, and is an embodiment in which an addition-reactive silicone-based composition is used as an adhesive. A description will be made on an embodiment (second embodiment) in which an addition-reactive silicone-based composition is used as a potting agent.

Figure 2A:
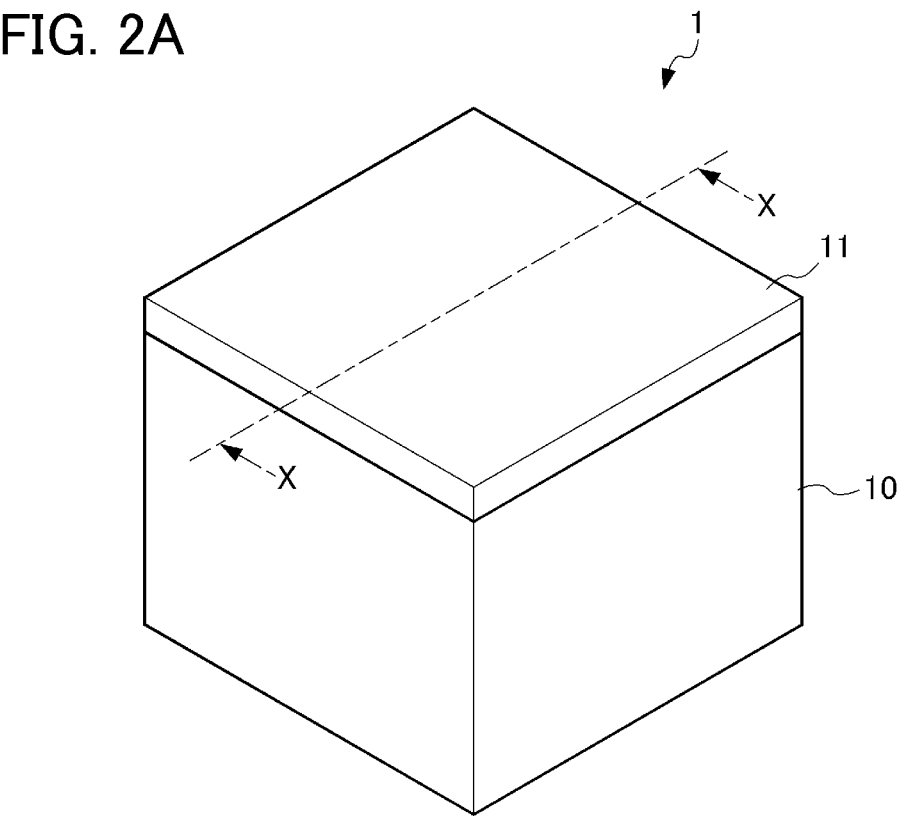
FIG. 2(a) is a perspective view schematically showing an integrated molded product 1 of a second embodiment.
Figure 2B:
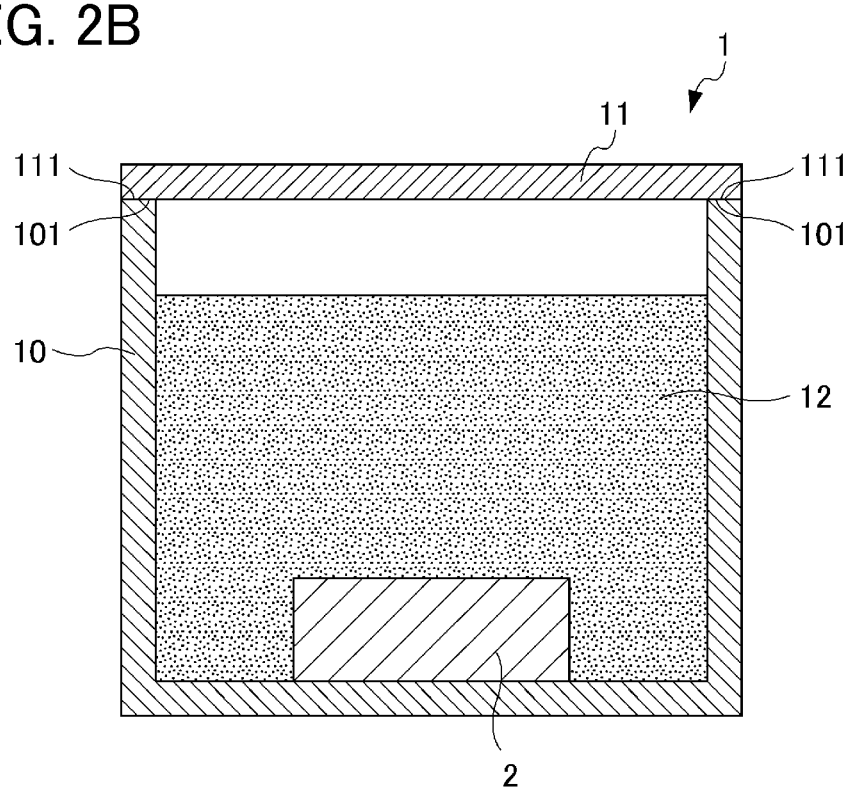
FIG. 2(b) is a cross-sectional view schematically showing a cross section taken along the line X-X of FIG. 2(a).

FIG. 2 is a view showing an integrated molded product of a second embodiment. FIG. 2(a) is a perspective view schematically showing the integrated molded product 1 of the second embodiment, and FIG. 2(b) is a cross-sectional view schematically showing a cross section taken along the line X-X of FIG. 2(a). An integrated molded product 1 of the second embodiment is different from the integrated molded product of first embodiment in that the integrated molded product of the second embodiment has a configuration in which electronic parts 2 are disposed inside the integrated molded product 1, and also has a configuration in which the periphery of the electronic parts 2 is covered with the addition-reactive silicone-based composition 12; and that bonding of the case 10 with the cover 11 is not limited to the case where the addition-reactive silicone-based composition is used, and bonding is sometimes performed by screw fastening or welding. In the following descriptions, the same reference numerals are used for components identical to those of the first embodiment, and the descriptions are omitted or simplified.

The electronic parts 2 are electronic parts such as sensors, hybrid ICs for automobiles and electric appliances, and semiconductor parts, and are disposed on a bottom surface of the case 10 by a conventionally known general method so as to be surrounded by the case 10 and the cover 11. The conventionally known general method includes, for example, a method in which electronic parts are disposed using an adhesive, or by screw fastening. Either an addition-reactive silicone-based composition or other adhesives may be used as the adhesive for bonding the first bonding surface 101 to the second bonding surface 111. As shown in FIG. 2(b), the periphery of the electronic parts 2 is surrounded by the addition-reactive silicone-based composition 12.

The addition-reactive silicone-based composition 12, with which the periphery of the electronic parts 2 is covered, is provided in the space surrounded by the case 10 and cover 11, and the electronic parts 2 so that the electronic parts 2 are completely immersed in the addition-reactive silicone-based composition 12. The addition-reactive silicone-based composition 12 functions as a potting agent.

A description will be briefly made on a method for producing an integrated molded product of a second embodiment shown in FIG. 2. The electronic parts 2 are disposed on the bottom of the case 10, and then inside the case 10 is filled with the addition-reactive silicone composition-based 12, and the first bonding surface 101 is bonded to the second bonding surface 111.

Conventionally, it has been considered that, in the case of boding other members using a resin molded product containing a phosphorus compound, or applying potting, the phosphorus compound inhibits curing of an addition-reactive silicone-based adhesive when using the addition-reactive silicone-based adhesive, and thus it is impossible to obtain an integrated molded product in which the resin molded product and the silicone-based adhesive are sufficiently in closed contact with each other. However, in the present invention, since the use amount of the phosphorus compound is adjusted within a specific range, curing inhibition of the addition-reactive silicone-based adhesive due to the phosphorus compound is suppressed, as mentioned above. As a result, the integrated molded product of the present invention becomes an integrated molded product in which the resin molded product and the addition-reactive silicone-based adhesive are sufficiently in closed contact with each other, in spite of the fact that the integrated molded product of the present invention contains the phosphorus compound in the resin molded product.

While a description was made on an integrated molded product of the present invention in case where an addition-reactive silicone-based composition is used as an adhesive and a potting agent, an integrated molded product in which an addition-reactive silicone-based composition is used as a sealing agent and a coating agent, etc is also included in the present invention.

While a description was made by way of a box-shaped integrated molded product including a case and a cover as an example, the integrated molded product is not limited to a box-shaped integrated molded product and, for example, an integrated molded product, in which electronic parts are adhered to a thermoplastic resin molded product as other members using an addition-reactive silicone-based composition, is also included in the present invention.

As mentioned above, the present invention enables combination of a resin molded product containing a phosphorus compound and an addition-reactive silicone-based composition, which has conventionally been considered to be impossible to be combined with each other. The thermoplastic resin molded product, the addition-reactive silicone-based composition, and the member will be described in more detail below.

<Thermoplastic Resin Molded Product>

The thermoplastic resin molded product contains a polybutylene terephthalate resin, a phosphorus compound, and other containable components (other components).

[Thermoplastic Resin]

As mentioned above, one of features of an addition-reactive silicone-based composition includes excellent heat resistance. When a thermoplastic resin having high heat resistance is employed as the thermoplastic resin, an integrated molded product having heat resistance is obtained, and it is also possible to sufficiently make use of features of the addition-reactive silicone-based composition. From such a point of view, a polybutylene terephthalate resin, which is excellent in heat resistance and can be preferably used in combination with various additives such as a flame retardant, is used as the thermoplastic resin.

Polybutylene terephthalate is a polybutylene terephthalate resin which is obtained by polycondensing a dicarboxylic acid component containing at least terephthalic acid or an ester-forming derivative thereof ($C_{1-6}$ alkyl ester, an acid halide, etc.) with a glycol component containing an alkylene glycol having at least 4 carbon atoms (1,4-butanediol) or an ester-forming derivative thereof (acetylated product, etc.). Polybutylene terephthalate resin is not limited to homopolybutylene terephthalate, and may be a copolymer which includes 60 mol % or more (particularly 75 mol % or more and 95 mol % or less) of a butylene terephthalate unit.

In the present invention, the amount of a terminal carboxyl group of polybutylene terephthalate resin to be used is not particularly limited as long as the object of the present invention is not inhibited. The amount of a terminal carboxyl group of polybutylene terephthalate resin to be used in the present invention is preferably 30 meq/kg or less, and more preferably 25 meq/kg or less. When using polybutylene terephthalate resin having a terminal carboxyl group within the above range, the obtained polybutylene terephthalate resin composition is less likely to undergo a decrease in strength due to hydrolysis under wet heat environment.

The intrinsic viscosity of polybutylene terephthalate resin used in the present invention is not particularly limited as long as the object of the present invention is not inhibited. An intrinsic viscosity (IV) of polybutylene terephthalate resin is preferably 0.60 dL/g or more and 1.2 dL/g or less. The intrinsic viscosity is more preferably 0.65 dL/g or more and 0.9 dL/g or less. When using polybutylene terephthalate having an intrinsic viscosity within the above range, the obtained polybutylene terephthalate resin composition is particularly excellent in moldability. It is also possible to adjust the intrinsic viscosity by blending polybutylene terephthalate resin having a different intrinsic viscosity. It is possible to prepare polybutylene terephthalate resin having an intrinsic viscosity of 0.9 dL/g, for example, by blending polybutylene terephthalate resin having an intrinsic viscosity of 1.0 dL/g with polybutylene terephthalate resin having an intrinsic viscosity of 0.7 dL/g. The intrinsic viscosity (IV) of polybutylene terephthalate resin can be measured, for example, in o-chlorophenol under the conditions of a temperature of 35° C.

In polybutylene terephthalate resin used in the present invention, the dicarboxylic acid component (comonomer component) other than terephthalic acid and an ester-forming derivative thereof includes, for example, $C_{8-14}$ aromatic dicarboxylic acids such as isophthalic acid, phthalic acid, 2,6-naphthalenedicarboxylic acid and 4,4'-dicarboxydiphenyl ether; $C_{4-16}$ alkanedicarboxylic acids such as succinic acid, adipic acid, azelaic acid and sebacic acid; $C_{5-10}$ cycloalkanedicarboxylic acids such as cyclohexanedicarboxylic acid; and ester-forming derivatives ($C_{1-6}$ alkyl ester derivative, acid halide, etc.) of these dicarboxylic acid components. These dicarboxylic acid components can be used alone, or two or more kinds of dicarboxylic acid components can be used in combination.

Among these dicarboxylic acid components, $C_{8-12}$ aromatic dicarboxylic acids such as isophthalic acid, and $C_{6-12}$ alkanedicarboxylic acids such as adipic acid, azelaic acid and sebacic acid are more preferable.

In polybutylene terephthalate resin used in the present invention, the glycol component (comonomer component) other than 1,4-butanediol includes, for example, $C_{2-10}$ alkylene glycols such as ethylene glycol, propylene glycol, trimethylene glycol, 1,3-butylene glycol, hexamethylene glycol, neopentyl glycol and 1,3-octanediol; polyoxyalkylene glycols such as diethylene glycol, triethylene glycol and dipropylene glycol; alicyclic diols such as cyclohexanedimethanol and hydrated bisphenol A; aromatic diol such as bisphenol A and 4,4'-dihydroxybiphenyl; $C_2$-alkylene oxide adducts of bisphenol A, such as an ethylene oxide 2 mol adduct of bisphenol A and a propylene oxide 3 mol adduct of bisphenol A; or ester-forming derivatives (acetylated product, etc.) of these glycols. These glycol components can be used alone, or two or more kinds of glycol components can be used in combination.

Among these glycol components, $C_{2-6}$ alkylene glycols such as ethylene glycol and trimethylene glycol, polyoxyalkylene glycols such as diethylene glycol, or alicyclic diols such as cyclohexanedimethanol are more preferable.

The comonomer component usable in addition to the dicarboxylic acid component and the glycol component includes, for example, aromatic hydroxycarboxylic acids such as 4-hydroxybenzoic acid, 3-hydroxybenzoic acid, 6-hydroxy-2-naphthoic acid and 4-carboxy-4'-hydroxybiphenyl; aliphatic hydroxycarboxylic acids such as glycolic acid and hydroxycaproic acid; $C_{3-12}$ lactones such as propiolactone, butyrolactone, valerolactone and caprolactone (ε-caprolactone, etc.); and ester-forming derivatives ($C_{1-6}$ alkyl ester derivative, acid halide, acetylated product, etc.) of these comonomer components.

Any polybutylene terephthalate copolymer copolymerized with the above-described comonomer component can be preferably used as polybutylene terephthalate. It is also possible to use, as a polybutylene terephthalate resin, a homopolybutylene terephthalate polymer in combination with a polybutylene terephthalate copolymer.

[Phosphorus Compound]

Among phosphorus compounds, a phosphorus compound other than a pentavalent phosphorus compound is particularly likely to inhibit curing of an addition-reactive silicone-based adhesive. A trivalent phosphorus compound is often used as the phosphorus compound other than a pentavalent phosphorus compound. A trivalent phosphorus compound is added to a thermoplastic resin as an antioxidant, for example, and thus enabling prevention of oxidative deterioration of a resin molded product. The trivalent phosphorus compound has the effect of inhibiting ester interchange of a polyester resin such as polybutylene terephthalate, and a composition obtained by adding the trivalent phosphorus compound exhibits higher heat stability.

The trivalent phosphorus compound includes, for example, phosphine-based, phosphinite-based, phosphonite-based, phosphite-based, phosphinous amide-based, phosphorus diamide-based, phosphorous triamide-based, phosphoramidite-based, and phosphorodiamidite-based phosphorus compounds.

In the present invention, the amount of the phosphorus compound contained in the resin molded product is 0.5% by mass or less. The phosphorus compound used as a stabilizer is preferably a phosphonite-based or phosphite-based phosphorus compound, and these phosphorus compounds can exert sufficient effect of inhibiting discoloration of the resin molded product in a small amount.

Examples of the phosphonite-based phosphorus compound include tetrakis(2,4-di-tert-butylphenyl)-4,4'-biphenylene phosphonite, tetrakis(2,4-di-tert-butylphenyl)-4,4'- biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite, and bis(2,6-di-tert-butylphenyl)-3-phenyl-phenyl phosphonite.

Examples of the phosphite-based phosphorus compound include triphenyl phosphite, tris(nonylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyldiphenyl phosphite, monodecyldiphenyl phosphite, monooctyldiphenyl phosphite, tris(diethylphenyl)phosphite, tris(di-isopropylphenyl)phosphite, tris(di-n-butylphenyl) phosphite, tris(2,4-di-tert-butylphenyl) phosphite, tris(2,6-di-tert-butylphenyl)phosphite, distearylpentaerythritol diphosphite, bis(2,4-di-tert-butylphenyl) pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, bis{2,4-bis(1-methyl-1-phenylethyl)phenyl}pentaerythritol diphosphite, phenylbisphenol A pentaerythritol diphosphite, bis(nonylphenyl)pentaerythritol diphosphite, and dicyclohexylpentaerythritol diphosphite.

[Other Components]

It is possible to add, in addition to the above thermoplastic resin and phosphorus compound, conventionally known additives such as inorganic fillers, antioxidants and pigments, to the resin molded product as long as effects of the present invention are not impaired. It is particularly preferred to use a glass fiber, which is one of inorganic fillers, since mechanical strength and heat resistance of a resin molded product is enhanced.

<Addition-reactive Silicone-based Composition>

The addition-reactive silicone-based composition is a composition which is cured at room temperature or heating, and conventionally known compositions can be used. Curing proceeds by an addition reaction using a platinum-based catalyst.

<Members>

Members are not particularly limited and may be other resin molded products, in addition to electronic parts such as sensors, hybrid ICs for automobiles and electric appliances, and semiconductor parts. When members are electronic parts, both adhesion and potting applications are general. In the case of a resin molded product, an addition-reactive silicone-based composition is mainly used for bonding with the thermoplastic resin molded product. The resin molded product may be composed of any resin, and may be specifically composed of either a thermoplastic resin or a thermosetting resin.

EXAMPLES

The present invention will be specifically described by way of Examples and Comparative Examples, but the present invention is not limited to these Examples.

<Materials>

Polybutylene terephthalate resin (PBT): manufactured by WinTech Polymer Ltd. under the trade name of "DURANEX 300FP" (intrinsic viscosity of 0.69)

Phosphorus compound 1: Tetrakis(2,4-di-t-butylphenyl)-4,4'-biphenylene phosphonite manufactured by Clariant (Japan) K.K. under the trade name of "Hostanox P-EPQ"

Phosphorus compound 2: Bis(2,4-di-t-butylphenyl)pentaerythritol diphosphite manufactured by ADEKA CORPORATION under the trade name of "ADEKA STAB PEP-24G"

Glass fiber having a fiber length of 400 μm and an average fiber diameter of ϕ10, manufactured by Nitto Boseki Co., Ltd. under the trade name of "CSF3PE-941"

Addition-reactive silicone-based adhesive: manufactured by Dow Corning Toray Silicone Co., Ltd. under the trade name of "SE1714"

<Production of First Thermoplastic Resin Molded Product and Second Thermoplastic Resin Molded Product>

According to the formulation (unit is % by mass) shown in Table 1, PBT, a phosphorus compound and a glass fiber were melt-kneaded (at a cylinder temperature of 260° C., a screw revolution of 130 rpm and an extrusion amount of 15 kg/hour) by a twin screw extruder to form pellets. The obtained pellets were dried at 140° C. for 3 hours and then charged in an injection molding machine (S2000i 100B, manufactured by FANUC CORPORATIONS) to produce resin test pieces (multi-purpose test pieces in conformity with ISO3167) used for the below-mentioned measurement of an adhesive strength. The center portion of each of test piece in conformity with ISO3167 was cut, and one portion was used as a first thermoplastic resin molded product, while the other portion was used as a second thermoplastic resin molded product.

<Production of Integrated Molded Product>

Figure 3A:
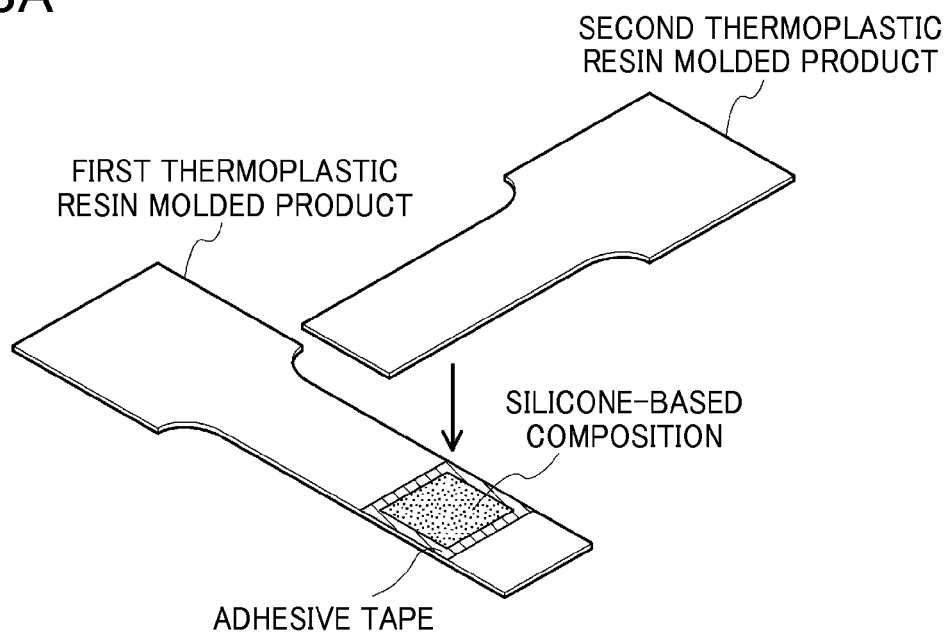
FIG. 3(a) is a view showing the production process of the integrated molded product and FIG. 3(b) is a view showing a method for evaluation of the integrated molded product.

As shown in FIG. 3(a), a NITOFLON adhesive tape (0.18 mm in thickness) manufactured by Nitto Denko Corporation provided with a hole measuring 7 mm×7 mm formed thereon was affixed to a first thermoplastic resin molded product, and then a silicone-based adhesive was applied to the portion of the hole. After application, a second thermoplastic resin molded product was laid on top of the first thermoplastic resin molded product, followed by fixation using a clip and further adhesion under the conditions at 120° C. for 0.5 hour. As a result, integrated molded products of Examples and Comparative Examples were obtained.

<Measurement of Adhesive Strength>

Figure 3B:
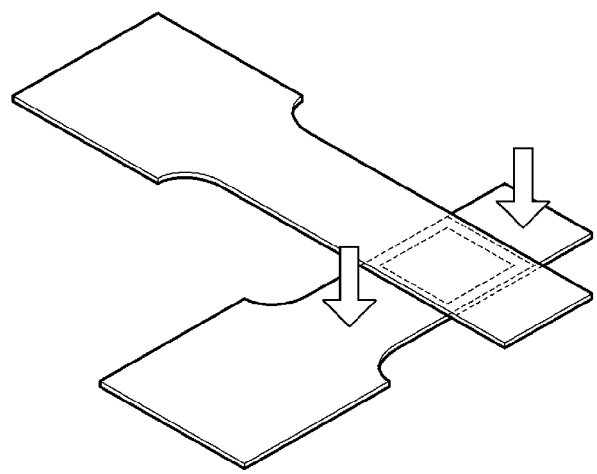

Each of bonded bodies was left to the atmosphere at 23° C. and 50%RH for 24 hours or more and fixed. Then, a second resin molded product was peeled under the condition of a test speed of 5 mm/minute using a universal testing machine Tensilon RTC-1325PL, manufactured by Orientec Corporation (specifically, peeling was performed by applying a pressure in the direction of outlined arrow in FIG. 3(b)),and a maximum value of a peel strength was measured. The measurement results are shown in Table 1.

TABLE 1

| | Example | | | | Comparative Example | |
|---|---|---|---|---|---|---|
| | 1 | 2 | 3 | 4 | 1 | 2 |
| PBT | 69.9 | 69.7 | 69.9 | 69.7 | 69 | 69 |
| Phosphorus compound 1 | 0.1 | 0.3 | | | 1 | |
| Phosphorus compound 2 | | | 0.1 | 0.3 | | 1 |
| Glass fiber | 30 | 30 | 30 | 30 | 30 | 30 |
| Silicone adhesive strength (MPa) | 5 | 5 | 5 | 5 | Not cured | Not cured |

The results of Examples and those of Comparative Examples revealed that it is possible to suppress curing inhibition of an addition-reactive silicone-based adhesive due to a phosphorus compound when the mixing amount of phosphorus compound is 0.5% by mass or less.

The invention claimed is:

1. An integrated molded product comprising a thermoplastic resin molded product made of a thermoplastic resin composition consisting of a polybutylene terephthalate resin, a phosphorus compound, and at least one component selected from an inorganic filler, an anti-oxidant, and a pigment, the content of the phosphorus compound being 0.5% by mass or less and the content of the polybutylene terephthalate resin being 40% by mass to 69.9% by mass;

an addition-reactive silicone composition; and a member;

wherein the thermoplastic resin molded product and the addition-reactive silicone-based composition are in contact with each other, and the phosphorus compound is a trivalent phosphorus compound.

2. The integrated molded product according to claim 1, wherein the trivalent phosphorus compound is a phosphonite-based compound and/or a phosphite-based compound.

* * * * *